United States Patent [19]
Cantrell et al.

[11] Patent Number: 5,388,225
[45] Date of Patent: Feb. 7, 1995

[54] TIME-DOMAIN BOUNDARY BRIDGE METHOD AND APPARATUS FOR ASYNCHRONOUS SEQUENTIAL MACHINES

[75] Inventors: Jay T. Cantrell, Dallas; Edward R. Schurig, Plano, both of Tex.

[73] Assignee: Texas Instruments Incorporated, Dallas, Tex.

[21] Appl. No.: 945,548

[22] Filed: Sep. 16, 1992

[51] Int. Cl.$^6$ .............................................. G06F 13/00
[52] U.S. Cl. ..................................... 395/325; 395/550;
364/270.5; 364/270.9; 364/DIG. 1; 327/261;
326/93
[58] Field of Search ............... 395/325, 375, 800, 500,
395/550; 364/270.5, 270.9, DIG. 1, 950.1,
DIG. 2; 307/590, 480

[56] References Cited
U.S. PATENT DOCUMENTS

| | | | |
|---|---|---|---|
| 4,339,808 | 7/1982 | North | 395/725 |
| 4,615,017 | 9/1986 | Finlay et al. | 395/325 |
| 4,660,169 | 4/1987 | Norgren et al. | 395/325 |
| 4,870,345 | 9/1989 | Tomioka et al. | 371/22.3 |
| 5,070,443 | 12/1991 | Priem et al. | 395/725 |
| 5,079,696 | 1/1992 | Priem et al. | 395/500 |
| 5,128,970 | 7/1992 | Murphy | 375/106 |
| 5,140,680 | 8/1992 | Best | 395/325 |
| 5,221,866 | 6/1993 | Takatsu | 307/465 |

Primary Examiner—Jack B. Harvey
Assistant Examiner—Glenn A. Auve
Attorney, Agent, or Firm—Mark E. Courtney; Robby T. Holland; Richard L. Donaldson

[57] ABSTRACT

A method and apparatus for a circuit physically realizing a time domain boundary buffer circuit for coupling an asynchronous sequential state machine controller to an asynchronous bus interface is described. A time domain boundary bridge latch circuit comprising a latch coupled to an asynchronous input, a delay element, and further coupled to a signal from the asynchronous sequential machine so that the signal from the asynchronous bus may be reliably captured is coupled to an input of the asynchronous sequential machine. The circuitry is designed to enable the asynchronous sequential machine to sample the asynchronous input as rapidly as possible without metastability errors. A second embodiment is disclosed for coupling an asynchronous sequential machine to a plurality of data bits on an asynchronous bus interface. Additional embodiments and applications are also disclosed.

29 Claims, 2 Drawing Sheets

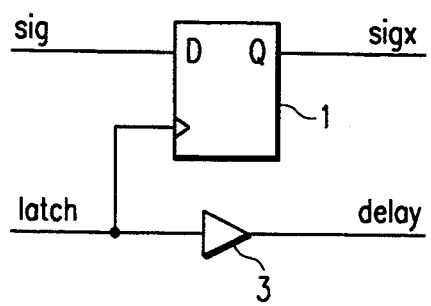
FIG. 1
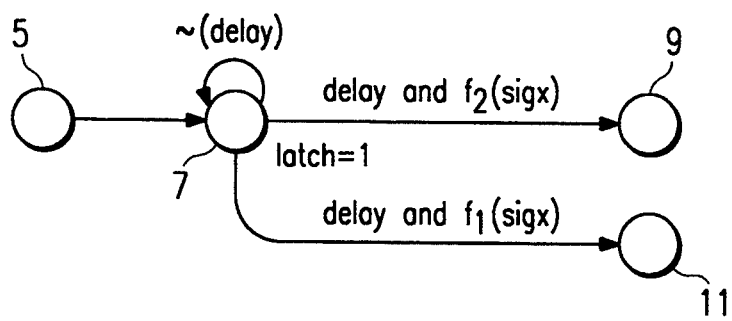
FIG. 2
Notes:
1. delay=metastability resolution time of D Flip Flop
2. $f_1$(sigx) and $f_2$(sigx) are two different functions of the sigx signal.
FIG. 3
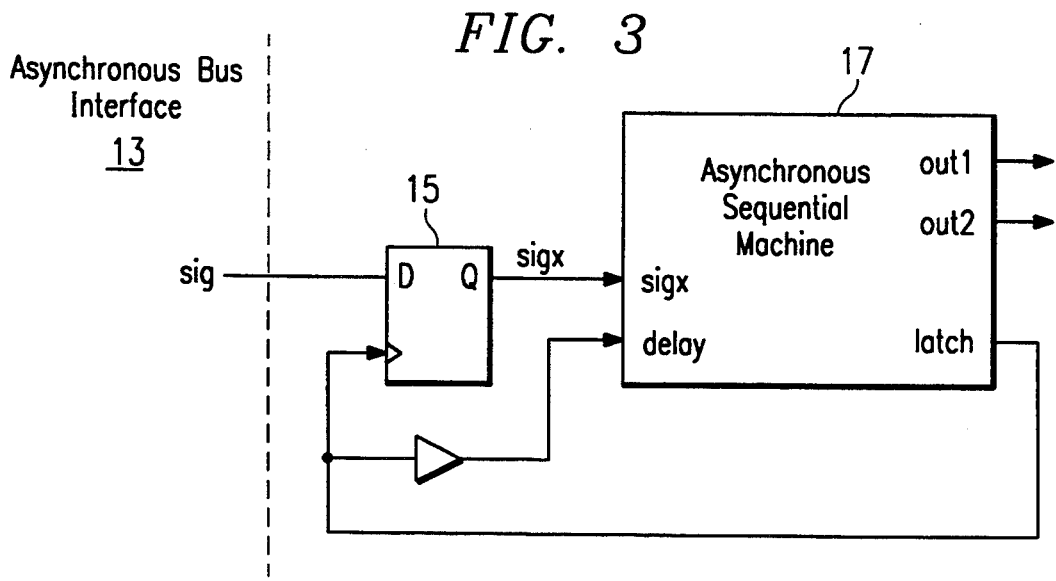

TIME-DOMAIN BOUNDARY BRIDGE METHOD AND APPARATUS FOR ASYNCHRONOUS SEQUENTIAL MACHINES

RELATED APPLICATIONS

This application relates to co-pending U.S. patent application Ser. No. 07/945,771, entitled "Time Domain Boundary Bridge Method and Apparatus", TI-17200, filed Sep. 16, 1992; and to U.S. patent application Ser. No. 07/945,547, entitled "Time Domain Boundary Buffer Method and Apparatus", TI-17201, filed Sep. 16, 1992.

FIELD OF THE INVENTION

This invention relates generally to a method and apparatus for improved circuity used in coupling asynchronous sequential machine circuitry to an asynchronous bus or signal, or to an unrelated time domain bus or signal, having one or more bits for use by the asynchronous sequential machine circuitry, wherein it is desirable that the detection of the asynchronous data signals occur without requiring that the signals have a specified duration or that the transmitting device be compelled to send the data by a manual handshake with the receiving device. The improved method and apparatus of the invention allows reliable operation of an asynchronous sequential machine coupled to such an unrelated time domain signal while achieving maximum throughput rates. The method and apparatus disclosed is applicable to circuits, integrated circuits and systems wherein observation, capture or detection of asynchronous data bus signals into an asynchronous sequential machine controller is required.

BACKGROUND OF THE INVENTION

Without limiting the scope of the invention, its background is described in connection with an asynchronous sequential machine controller circuit coupled to an asynchronous bus interface.

In systems using an asynchronous bus to couple devices, or in coupling two devices clocked on unrelated clock time domains, the receiving device must be able to reliably receive data from the asynchronous bus and capture data from it without missing the next data word to be sent on the bus. As the fastest possible response is desired in order to enable the bus to send additional data words as rapidly as possible, it would be advantageous to use an asynchronous sequential machine as the control logic coupled to the bus. The asynchronous sequential machine can respond to changes on the bus interface as rapidly as the switching speed of the logic gates used allows, unlike sequential machine based controllers, which can only transition from state to state at clock cycle boundaries. However, coupling external asynchronous signals to an asynchronous sequential controller creates reliability problems, because the asynchronous controller may transition from state to state on an invalid or transitioning input, creating a metastability condition or erroneous state in the receiving device.

Heretofore, in the design of asynchronous bus coupling circuitry, the typical approach to these problems was to design the asynchronous sequential machine with protective "go/no-go" constructs or extra states to prevent the machine from incorrectly operating on an input signal which is in transition. Alternatively, the receiving device can handshake with the sending device so that no action is taken by either device during a time when the other device has signals in transition, and the transmitting device only changes the signals on the bus when compelled to do so by the asynchronous sequential machine. Both of these solutions require additional states or bus signals, and result in a less than optimum throughput rate on the asynchronous bus interface as well as additional hardware in the form of extra channels on the bus.

A need for a method and apparatus for coupling asynchronous data bus signals to the inputs of an asynchronous sequential machine, without requiting additional handshaking signals or unduly restricting the duration of such signals or events on the asynchronous bus, and using an easily implemented solution, thus exists. Accordingly, improvements which overcome any or all of these problems are presently desirable.

SUMMARY OF THE INVENTION

Generally, and in one form of the invention, a circuit is described which implements a time domain boundary bridge circuit for asynchronous machine inputs in a standard digital logic process. In the preferred embodiment of the invention, one or more data signals on the asynchronous bus are latched into a time domain boundary bridge circuit on a signal provided by the asynchronous sequential machine; the signals are held in a register for the time required to insure the register is not in a metastable condition, and then the asynchronous sequential machine receives the latched signal and can act on the latched signal without the risk of an error due to a metastable input. The time domain boundary bridge circuit comprises a flip flop or a latch which samples the incoming data signal on the rising edge of an output from the asynchronous sequential machine. After raising this signal, the machine transitions to a state where it waits for a delayed version of the latched incoming signal. The delay is provided by a delay element specifically implemented to delay the incoming signal for exactly the time known to correspond to the time required to insure the flip-flop or latch is not in a metastable condition. Once the delayed signal reaches the sequential machine, the machine can sample the latched input signal at the output of the flip-flop and transition to the next appropriate state. This solution provides the faster possible error-free transition following an event on the asynchronous bus with a minimal amount of hardware.

A second embodiment is described for systems where multiple bits of data are transmitted on the asynchronous bus and are to be sampled by the sequential machine of the receiving circuit. In this embodiment an enable or strobe signal sent by the transmitting device on the asynchronous bus is latched into the time domain boundary bridge circuit of the first embodiment, and the asynchronous sequential machine only samples the data once the enable or strobed signal has been latched and held for the metastability delay of the sampling latch. Thus the asynchronous sequential machine never samples data bits in transition on the asynchronous bus interface, and no errors will occur due to metastability associated with transitioning input signals.

BRIEF DESCRIPTION OF THE DRAWINGS

In the drawings:

FIG. 1 depicts the time domain boundary bridge latch circuit of the invention;

FIG. 2 depicts the state transitions of an asynchronous sequential machine utilizing the time domain boundary bridge circuit of the invention;

FIG. 3 depicts a block diagram of the asynchronous sequential machine coupled to an asynchronous uncompelled input by use of the time domain boundary bridge latch circuit;

Corresponding numerals and symbols in the different figures refer to corresponding parts unless otherwise indicated.

DETAILED DESCRIPTION OF PREFERRED EMBODIMENTS

Figure 4:
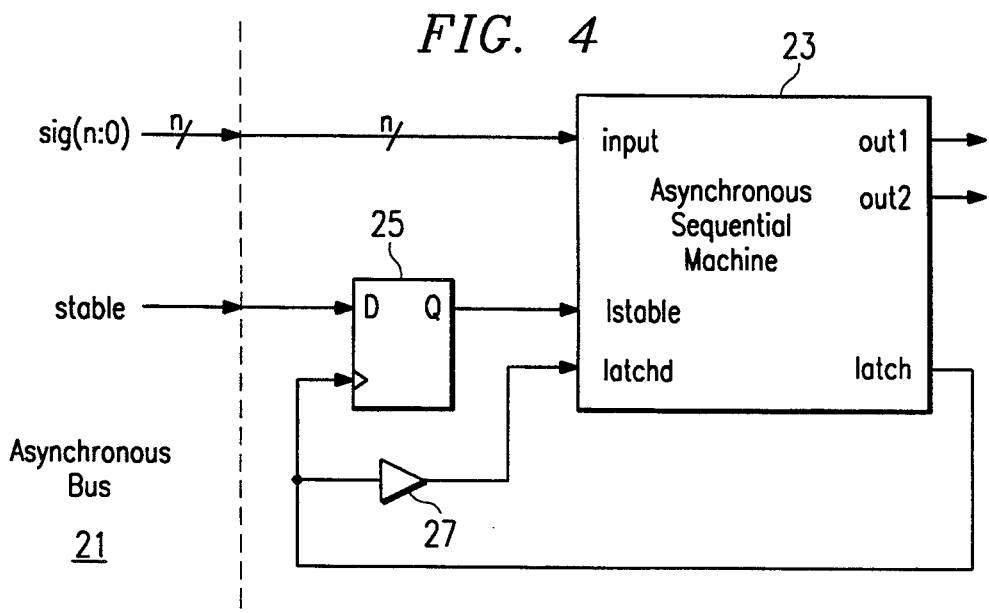
FIG. 4 depicts an alternative embodiment comprising an asynchronous bus interface having multiple data bits accompanied by an enable or strobe signal, an asynchronous sequential machine sampling said data bits, and a time domain boundary bridge latch circuit operating with the asynchronous sequential machine to prevent metastability problems in sampling the data bits.

In designing circuitry to monitor and control asynchronous bus interfaces, it is desirable to use asynchronous sequential machines for the bus coupling control logic circuitry. This is so because an asynchronous sequential machine can respond to events on the asynchronous bus in the amount of time required for the logic within the machine t o settle into a new state, and is not restricted to a particular clock rate. In contrast, a traditional synchronous state machine will only be able to transition to a new state in response to an event on the bus at the next clock edge, and thus is slower in responding and therefore provides a less than maximum throughput rate.

However, care must be taken in coupling an unclocked asynchronous sequential machine to uncompelled or externally driven asynchronous input signals, as the sequential machine will transition to a new state as soon as the monitored signal begins changing. Since the signal is transmitted by external logic operating in an unrelated time domain and without any compulsion from the receiving device, the incoming signal may change at any time. This can lead to errors in transitions of states of the asynchronous sequential machine due to the monitoring of signals in transition, commonly referred to as metastability errors. Even if the incoming signal is fed to a latch or register, the signal may change value just as it is latched, and the output of the latch may go into a mestastable condition for some time. Coupling this latched signal to an input of an asynchronous sequential machine will therefore also lead to metastability errors.

FIG. 1 depicts the time domain boundary bridge latch circuit of the invention comprising an input; "sig" from the asynchronous bus interface, a latch 1 coupled to the input "sig" and being clocked by a signal "latch", an output "sigx" being a latched version of the input "sig", and an output "Delay" being a version of the signal "latch" after it is delayed by the delay element 3.

In operation, an asynchronous sequential machine will transition to a state wherein it is ready to sample for the next input to occur on the input "sig", which is asynchronous to the local time domain. Because the input "sig" may transition at any point, it is essential to the proper operation of the asynchronous sequential machine that the input "sig" not be sampled while it transitions, but only after it has reached a steady value. The invention herein requires that the asynchronous sequential machine provide the signal labeled "latch" in the drawing, which will clock latch 1 and thereby sample the input signal "sig".

Since it is known that the input "sig" may have been in transition when the signal "latch" is driven, the delay element 3 is used to create a second signal "delay". The amount of delay created by delay element 3 is determined by the designer from a study of the particular characteristics of the physical process being used to implement latch 1, so that the delay time provided by delay element 3 is slightly greater than the maximum time it requires the output of latch 1 to settle when a transitioning input is latched at the D input. This delay, hereinafter referred to as the metastability delay, is the amount of time which must pass before it can be said that the output of latch 1 is stable, and therefore valid for use as an input.

The output of the delay element, labeled "delay", is input to the asynchronous sequential machine and the machine is designed so that the output of the latch 1, signal "sigx", is not sampled by the asynchronous sequential machine until signal "delay" reaches a logic high state. In this manner the asynchronous sequential machine may be coupled to the incoming signal "sig" without creating a metastability hazard.

FIG. 2 depicts a state diagram of the particular states of the asynchronous sequential machine logic when it is desired to sample an asynchronous bus input signal. State 5 is the state the machine is in when it is desirable to sample the incoming asynchronous signal from the bus interface. In state 7, the machine asserts the "latch" signal and remains in the state 7 until the "delay" signal reaches a logic high. On detecting the "delay" signal attaining a logic high, the asynchronous sequential machine may transition to either one of the two states 9 and 11 depending on the value of the latched signal "sigx".

FIG. 3 depicts a block diagram of the asynchronous sequential machine coupled to the time domain boundary bridge latch circuit of the invention for receiving an asynchronous input. Asynchronous bus interface 13 is coupled to time domain boundary bridge latch circuit 15, which is likewise coupled to asynchronous sequential machine 17. Note that the "latch" signal referred to in describing the elements of FIGS. 1 and 2 is an output of the asynchronous sequential machine. By controlling this signal the sequential machine is designed not to sample the incoming uncompelled input signal unless the machine is in an appropriate state. This allows the user to determine exactly when the incoming signal is to be sampled and prevents metastability errors caused by sampling of a signal in transition.

FIG. 4 depicts an alternative embodiment in an application where the asynchronous sequential machine is coupled to multiple data bits on an asynchronous bus interface. Asynchronous bus interface 21 is coupled to asynchronous sequential machine 23 and time domain boundary bridge circuit comprised of latch* 25 and delay element 27.

In operation, asynchronous sequential machine logic 23 is sampling a multiple data bit bus labeled "sig(n:0)" which may transition at any time. This situation presents an additional requirement on the transmitting device, because the receiving device must only sample the multiple bit bus at times when all of the bits are stable, i.e. when the data word on the bus is valid. In the figure, the transmitting device indicates this to the receiving device by asserting the "stable" signal to the receiving device.

The time domain boundary bridge circuit comprised of latch 25 and delay element 23 is coupled to the "stable" input signal, while the data bus bits are coupled directly to the inputs of asynchronous sequential machine 23. When the asynchronous sequential machine reaches a state wherein it is supposed to sample the data on the bus, the machine will assert the "latch" output as before. Once the "latch" output is asserted, the machine waits until the delayed version of "latch", the "latchd" input, reaches a logic high. At this point, the machine can transition to a state to receive the data if a valid "lstable" signal is detected, or back to the original sample data state if no valid "lstable" signal is present.

Note that by latching only the "stable" signal from the bus interface, a single latch is all that is required to reliably sample five or more bits from the bus interface, in this example the "stable" input and the four bit data bus "sig". However, this implementation requires that the asynchronous bus not remove the data within the metastable delay time of latch 21, after the "enable" signal is asserted. If the particular bus interface is such that this requirement cannot be met, each bit on the bus being sampled by the asynchronous sequential machine will require its own latch which will capture the bits, but only a single "delay" signal and corresponding delay element is required.

Figure 5:
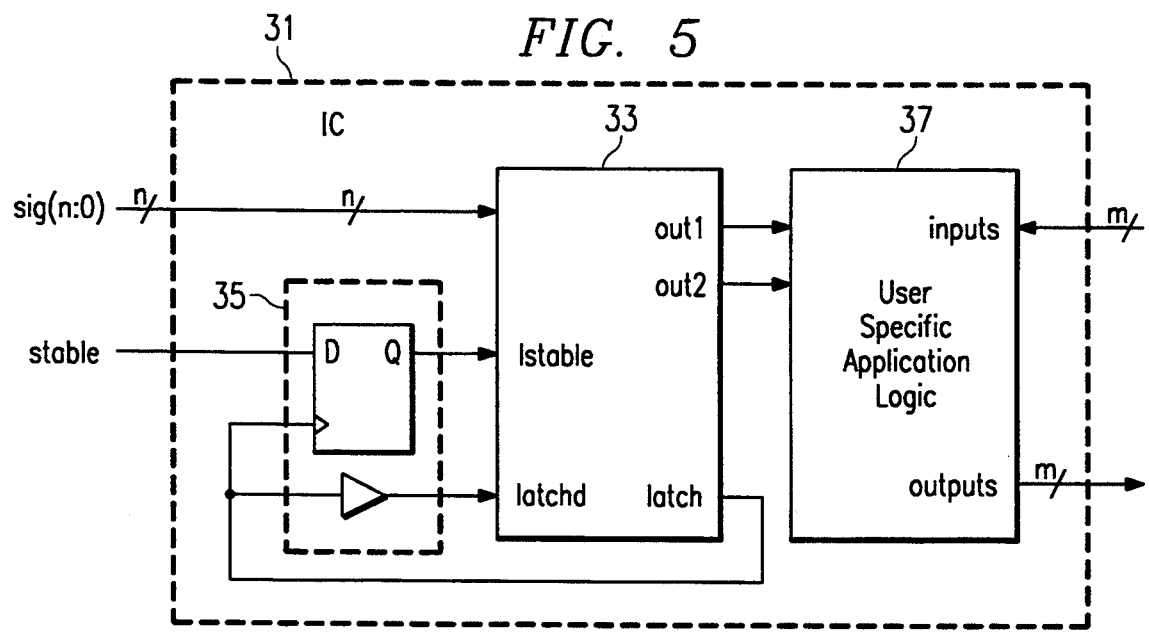
FIG. 5 depicts an integrated circuit incorporating the asynchronous sequential machine having the time domain boundary bridge latch circuit of the invention, the invention coupling a logic block containing user specified application logic to an asynchronous bus interface.

FIG. 5 depicts an IC 31 incorporating the asynchronous sequential machine of the invention 33 and the time domain boundary bridge circuitry 35, and further depicts user specified logic circuitry 37 coupled to the invention. In operation the time domain boundary bridge and the asynchronous sequential machine circuitry of the invention enables the user to couple any user specified logic, which can be but is not restricted to ROM, RAM, EPROM, microprocessor logic, microcontrollers, or any other ASIC or user programmable application logic, to an asynchronous bus interface for data transfers.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. Circuitry for coupling sequential logic circuitry to an asynchronous input signal, said circuitry for coupling comprising:
   a first memory coupled to an input terminal, said first memory having a control signal and capturing data present at said input terminal responsive to a transition of the control signal, said first memory having an output for transmitting the captured data, said first memory having a metastibility delay from a transition at the input to a valid output;
   said sequential logic circuitry coupled to said output of said first memory, and having said control signal as one of its outputs;
   delay circuitry coupled to said control signal and outputting a delayed control signal;
   wherein said sequential logic circuitry produces a pulse on said control signal in response to certain sequences within said sequential logic circuitry, said memory capturing said asynchronous input signal in response to said pulse on said control signal, said delay circuitry being coupled so that said delayed control signal determines when the output of said first memory may be safely input to said sequential logic circuitry.

2. The circuitry of claim 1, wherein said delay circuitry comprises a delay element having a predetermined delay time greater than the metastability delay of said first memory.

3. The circuitry of claim 1, wherein said first memory comprises a D type flip-flop.

4. The circuitry of claim 1, wherein said sequential logic circuitry comprises an asynchronous sequential machine.

5. The circuitry of claim 4 wherein said asynchronous sequential machine comprises a multiple state asynchronous sequential state controller.

6. The circuitry of claim 4, wherein said asynchronous sequential machine further comprises:
   a first machine state wherein said data at said input terminal is to be sampled as input;
   a second machine state wherein said control signal is asserted to said first memory; and
   a third machine state wherein said delayed control signal has been detected and said data has been sampled.

7. The circuitry of claim 6, wherein said asynchronous sequential machine further comprises:
   a fourth machine state wherein said data that has been sampled has been determined to be in a logic high condition; and
   a fifth machine state wherein said data that has been sampled has been determined to be in a logic low condition.

8. Circuitry for coupling an asynchronous data bus to asynchronous control logic, comprising:
   a first memory coupled to an input terminal for receiving a strobe signal, said first memory receiving and storing said strobe signal responsive to a control signal, said first memory having an output for transmitting said stored strobe signal;
   a first delay element having an input coupled to said control signal, said first delay element outputting a delayed control signal;
   an asynchronous sequential machine coupled to said first memory and to said delayed control signal, further coupled to a plurality of data signals from said asynchronous data bus, and having said control signal as an output;
   wherein said asynchronous sequential machine asserts said control signal responsive to certain sequences occurring within said asynchronous sequential machine, said machine then transitioning to a state wherein said plurality of data signals will be selectively captured responsive to a transition in said delayed control signal, so that the asynchronous sequential machine captures said data signals only when they are stable.

9. The circuitry of claim 8, wherein said first memory comprises a D type flip flop clocked by said control signal, said flip flop having an inherent metastability delay.

10. The circuitry of claim 9, wherein said delay element provides a delay greater than the metastability delay of said first memory.

11. The circuitry of claim 10, wherein said delay element comprises a predetermined number of logic gates, coupled sequentially, so that the delay of said delay element is a predetermined delay.

12. The circuitry of claim 10, wherein said delay element comprises an inverter circuit having a predetermined switching speed.

13. The asynchronous sequential machine of claim 8, further comprising:
a first machine state wherein it is desired to capture the data on the asynchronous data bus and wherein said control signal is asserted;
a second machine state wherein said delayed control signal is tested;
a third machine state wherein the output of said first memory is tested; and
a fourth machine state wherein said data from said asynchronous bus is sampled responsive to the value of said output of said first memory.

14. A method of coupling asynchronous logic circuitry to an asynchronous signal, comprising the steps of:
providing a first memory coupled to an input terminal for receiving said asynchronous signal, said first memory for capturing said asynchronous signal responsive to a control signal, said first memory having an output for transmitting said captured asynchronous signal, said first memory having a metastability delay for valid output after an input transition;
providing a delay element coupled to said control input, said delay element outputting a delayed control input signal;
providing sequential control logic coupled to the output of said first memory and to said delay element, and further having said control signal as an output; and
operating said sequential control logic such that in response to certain sequences occurring within said sequential control logic circuitry said control signal output is asserted, and said sequential logic circuitry receives the output of said first memory responsive to a transition in the delayed control input signal.

15. The method of claim 14, wherein said step of providing said first memory comprises providing an D type flip circuit.

16. The method of claim 15, wherein said step of providing a delay element comprises the step of providing a delay element having a delay time greater than the metastability delay of said first memory.

17. The method of claim 16, wherein said step of providing sequential control logic comprises the step of providing an asynchronous sequential state controller.

18. The method of claim 17, and further comprising the steps of:
creating a first state in said asynchronous sequential state controller wherein said asynchronous signal is to be sampled, and asserting said control signal output; and
creating a second state in said asynchronous sequential state controller wherein said output of said first memory is sampled responsive to the transition in the output of said delay element; and
creating a third state in said asynchronous sequential machine wherein a user specified operation selectively takes place responsive to the output of said first memory.

19. A method of coupling a plurality of asynchronous data signals to an asynchronous logic circuit, comprising the steps of:
providing a first memory coupled to an input terminal for receiving a strobe signal, said first memory receiving and storing said strobe signal responsive to a control signal, said first memory having an output for transmitting said stored strobe signal, said first memory having a metastability delay from a transition at the input to a valid output;
providing a first delay element coupled to said control signal to output a delayed control signal;
providing an asynchronous sequential machine coupled to said first memory and to said delayed control signal, further coupled to a plurality of data signals from said asynchronous data bus, and having said control signal as an output; and
operating said asynchronous sequential machine to cause said asynchronous sequential machine to assert said control signal responsive to certain sequences occurring within said asynchronous sequential machine, said machine then transitioning to a state wherein said plurality of data signals will be selectively captured responsive to a transition in said delayed control signal, the asynchronous sequential machine thereby capturing said data signals only when they are stable.

20. The method of claim 19, wherein said step of providing a first memory comprises providing a D type flip flop clocked by said control signal.

21. The method of claim 19, wherein said delay element provides a delay greater than the metastability delay of said first memory.

22. The method of claim 21, wherein said delay element comprises a predetermined number of logic gates, coupled sequentially, so that the delay of said delay element is a predetermined delay.

23. The method of claim 21, wherein said delay element comprises an inverter circuit having a predetermined switching speed.

24. The method of claim 19, wherein said step of providing an asynchronous sequential machine further comprises the steps of:
providing a first machine state wherein it is desired to capture the data on the asynchronous data bus and wherein said control signal is asserted;
providing a second machine state wherein said delayed control signal is tested;
providing a third machine state wherein the output of said first memory is tested; and
providing a fourth machine state wherein said data from said asynchronous bus is sampled responsive to the output of said first memory.

25. An integrated circuit for receiving data from an asynchronous data bus, said integrated circuit comprising:
a first memory coupled to an enable input, and capturing the data at said enable input responsive to a control signal, said first memory having an output for transmitting said captured data;
a first delay element coupled to said control signal, and having a delayed control signal as its output;
an asynchronous sequential machine coupled to said delay element and to said delayed control signal, said asynchronous sequential machine asserting said control signal and capturing a plurality of data signals from said asynchronous data bus;

user defined application circuitry coupled to said asynchronous sequential machine and having user defined inputs and outputs; and the asynchronous sequential machine transmitting captured data from said asynchronous data bus to said user defined application logic, said user defined application logic thereby being isolated from any mestastable conditions on said asynchronous data bus by said first memory, said delay element and said asynchronous sequential machine.

26. The integrated circuit of claim 25, wherein said user application circuitry comprises a memory.

27. The integrated circuit of claim 25, wherein said user application circuitry comprises an arithmetic logic function.

28. The integrated circuit of claim 25, wherein said user application circuitry comprises a user programmable logic array.

29. The integrated circuit of claim 25, wherein said user application circuitry comprises a processor.

* * * * *